July 4, 1933.  J. D. ZAHM ET AL  1,916,877
ANIMAL TRAP
Filed April 16, 1931

INVENTOR
JOSEPH D. ZAHM
JOHN U. LEHN
BY *Marks & Clerk*
ATTORNEY

Patented July 4, 1933

1,916,877

UNITED STATES PATENT OFFICE

JOSEPH D. ZAHM AND JOHN U. LEHN, OF LITITZ, PENNSYLVANIA, ASSIGNORS TO ANIMAL TRAP COMPANY OF AMERICA, OF LITITZ, PENNSYLVANIA, A CORPORATION OF PENNSYLVANIA

ANIMAL TRAP

Application filed April 16, 1931. Serial No. 530,480.

This invention relates to what are commonly known as pivoted or hinged jaw traps for catching animals.

The object of the invention is to provide in an animal trap of the aforesaid type an improved construction and arrangement of detent which in addition to exerting a positive restraining action on the jaws when the trap is set will when the trap is sprung cooperate with the jaws to insure its rapid ejection from the path of the latter.

In order that the invention may be clearly understood reference will now be made to the accompanying drawing in which a constructional form is illustrated by way of example and in which:—

Figure 1:
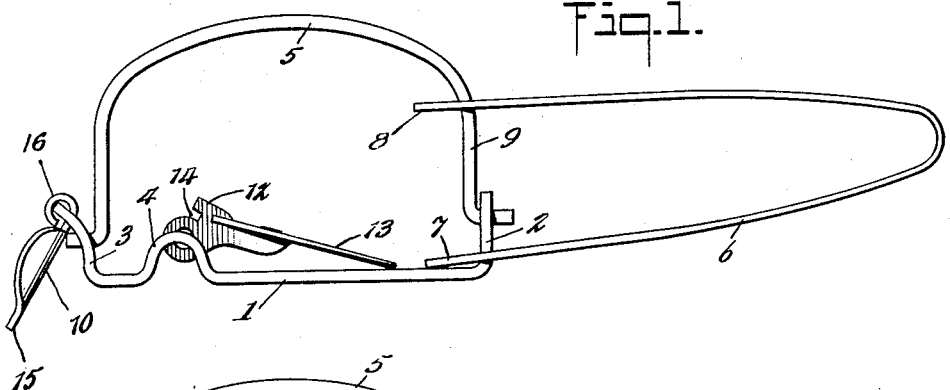
Figure 1 is a side elevation showing the trap sprung.

In the particular form illustrated the trap comprises a base 1 with upturned perforate lugs 2 and 3 at opposite ends thereof and a raised part 4 intermediate its ends. Pivoted in the lugs 2 and 3 are jaws 5 and at one end of the trap is a spring 6 with perforate ends 7 and 8 both of which fit loosely over the lug 2 while the end 8 is adapted to cooperate with inclined surfaces 9 on the exterior of the jaws 5.

Pivoted on the upturned lug 3 by means of an eye 16 is a sheet metal detent 10 of dished formation having cam surfaces 11 adapted to cooperate with the inner faces of the jaws 5 and pivoted in the raised part 4 is a latch 12 carrying a bait pan 13 and provided with a notch 14 adapted to receive the end 15 of the detent 10. It should be particularly noted that the lug 3 is curved outwardly away from the jaws 5 to bring the pivotal axis of the detent 10 external to the pivot of the juxtaposed ends of the jaws and that the eye 16 is so formed that when the detent 10 is in the set position illustrated by Figure 2 it lies below the level of the body portion of the detent, thus throwing its pivotal axis still further away from the point of pivotation of the jaws. This, together with the peculiar profile of the detent and its dished formation, results in a perfect sliding action between the detent and the jaws which absolutely prevents wedging of the former when the latter are sprung.

Figure 2:
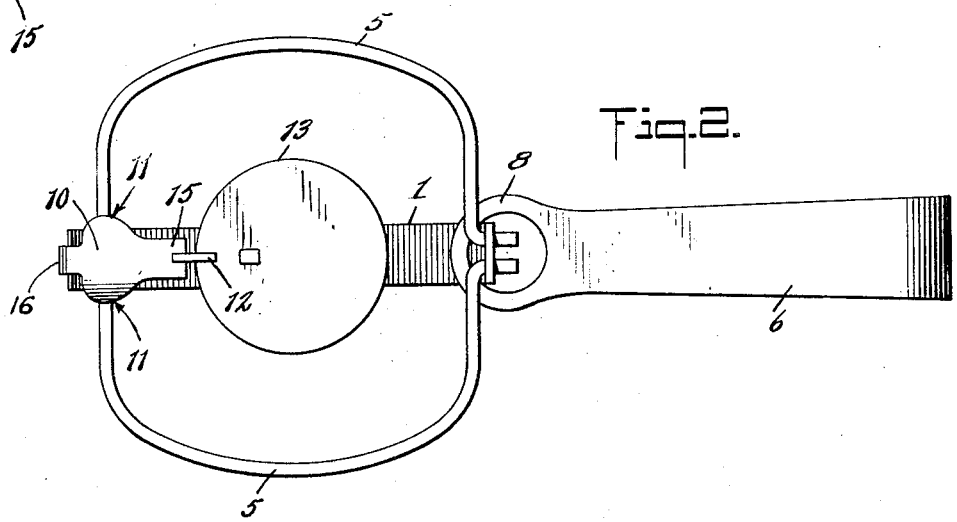
Fig. 2 is a plan showing the trap set.
Figure 3:
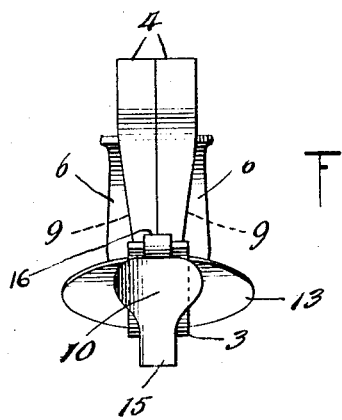
Fig. 3 is an end elevation viewed from the left of Fig. 1.

To set the trap the spring 6 is compressed and the jaws 5 pivoted downwardly whereupon the detent 10 can be swung into the position illustrated by Fig. 2 of the drawing with its end 15 in engagement with the notch 14 in the latch 12.

The trap is, of course, sprung in the usual manner by depression of the bait pan 13, when the spring 6 effects a rapid closure of the jaws 5. During the initial closing movement of the jaws 5 the inner faces thereof cooperate with the cam surfaces 11 on the detent 10 and effect the rapid ejection of the latter from the path of the jaws 5. Owing to the dished formation of the detent 10 only the cam surfaces 11 contact with the jaws.

We claim:—

1. An animal trap comprising a base member, upturned perforate lugs at opposite ends thereof, one of which is bent outwardly, jaws pivoted in said upturned lugs, a spring to close said jaws, a latch and a solid cam shaped detent of dished formation to engage said latch and to cooperate with said jaws and having thereon a downwardly curled eye which is received in an opening in said outwardly bent lug to pivotally connect said detent to said lug.

2. An animal trap comprising a base member, upturned perforate lugs at opposite ends thereof, one of which is bent outwardly, jaws pivoted in said upturned lugs, a spring to close said jaws, a latch and a solid cam shaped detent of dished formation to engage said latch and to cooperate with said jaws and having thereon a downwardly curled eye which is received in an opening in said outwardly bent lug to pivotally connect said detent to said lug said eye lying wholly below the level of the body portion of the detent when the detent is in engagement with said latch.

3. An animal trap comprising a base member, upturned perforate lugs at opposite ends thereof, one of which is bent outwardly, jaws pivoted in said upturned lugs, a spring to close said jaws, a latch and a solid cam shaped detent of dished formation to engage said latch and to cooperate with said jaws and having thereon a downwardly curled eye which is received in an opening in said outwardly bent lug to pivotally connect said detent to said lug externally of the pivot of the juxtaposed ends of the jaws to said lug, said eye lying wholly below the level of the body portion of the detent when the detent is in engagement with said latch.

In testimony whereof we affix our signatures.

JOSEPH D. ZAHM.
JOHN U. LEHN.